United States Patent [19]

Bragg et al.

[11] Patent Number: 5,024,052

[45] Date of Patent: * Jun. 18, 1991

[54] APPARATUS FOR HARVESTING BERRIES ON LOW PLANTS

[75] Inventors: R. D. Bragg; H. Lloyd Weatherbee, both of Collingwood, Nova Scotia, Canada

[73] Assignee: Doug Bragg Enterprises Ltd., Canada

[*] Notice: The portion of the term of this patent subsequent to Sep. 5, 2006 has been disclaimed.

[21] Appl. No.: 197,311

[22] Filed: May 23, 1988

Related U.S. Application Data

[63] Continuation-in-part of Ser. No. 753,524, Jul. 10, 1985, Pat. No. 4,862,683.

[51] Int. Cl.$^5$ .............................................. A01D 45/22
[52] U.S. Cl. ................................................ 56/330
[58] Field of Search .................................... 56/330–1, 56/DIG. 10, DIG. 12, DIG. 14, DIG. 17, 14.9, 15.6, 15.8, 15.9, 16.1, 16.4–16.6

[56] References Cited

U.S. PATENT DOCUMENTS

| | | | |
|---|---|---|---|
| 1,193,189 | 8/1916 | Richter | 56/330 |
| 1,233,089 | 7/1917 | Maglathlin | 56/330 |
| 1,452,629 | 4/1923 | Veeder | 56/330 |
| 1,622,117 | 3/1927 | Jenkins | 56/13.5 |
| 2,220,398 | 11/1940 | Dreikosen | 171/92 |
| 2,267,879 | 12/1941 | Tillitt | 171/92 |
| 2,426,545 | 8/1947 | Young | 171/108 |
| 2,696,706 | 12/1954 | Getsinger | 56/330 |
| 3,130,791 | 4/1964 | Schmidt | 171/53 |
| 3,165,876 | 1/1965 | Towson | 56/13.5 |
| 3,252,520 | 5/1966 | Hill et al. | 56/229 X |
| 3,473,613 | 10/1969 | Boyce | 171/14 |
| 3,616,630 | 11/1971 | Gray et al. | 56/330 |
| 3,648,447 | 3/1972 | Burton | 56/330 |
| 3,885,375 | 5/1975 | Solterbeck | 56/DIG. 11 X |
| 3,918,239 | 11/1975 | Aldred et al. | 56/17.2 X |
| 4,162,606 | 7/1979 | Weichel | 56/DIG. 10 X |
| 4,335,570 | 6/1982 | Fitzmaurice | 56/330 X |

(List continued on next page.)

FOREIGN PATENT DOCUMENTS

| | | |
|---|---|---|
| 0189690 | 4/1919 | Canada . |
| 0522106 | 2/1956 | Canada . |
| 0523354 | 4/1956 | Canada . |

(List continued on next page.)

Primary Examiner—Angela D. Sykes
Attorney, Agent, or Firm—Stevens, Davis, Miller & Mosher

[57] ABSTRACT

Improved apparatus for harvesting berries on low plants, particularly strawberries, is described. The apparatus includes a picking head having a frame movable along the ground over the crop of berries in the path of travel. A reel is mounted on this frame for rotation about an axis transverse to the travel path. This reel includes a series of circumferentially spaced rows of tines capable of moving and engaging the berries to strip them from the plants. A cam arrangement is provided for moving the tines relative to the reel to facilitate the stripping action and to facilitate deposit of the stripped berries into the reel. A conveyor system is provided to carry the berries which have been deposited into the reel outwardly of same and thence ultimately into a container.

Special brushes for clearing the tines are provided including an auxiliary brush to overcome a problem arising from use on strawberries. A picking head is mounted on multiple wheels so as to roll along the ground and means are provided for towing the picking head in such a way as to provide substantial freedom of movement to accommodate any unevenness in the ground. Modified tines and tine bars accommodate the picking of strawberries and tine shape and spacings have been selected on the basis of experimental work to provide good overall results. The cam arrangement has also been modified and reel rotation direction selected as to provide efficient strawberry picking. The apparatus can be connected to and powered from a wide range of conventional farm tractors. The harvester is rugged and durable and reasonable in cost.

5 Claims, 15 Drawing Sheets

U.S. PATENT DOCUMENTS

| | | | |
|---|---|---|---|
| 4,343,138 | 8/1982 | Neverburg | 56/DIG. 10 X |
| 4,402,175 | 9/1983 | Watenpaugh | 56/330 X |
| 4,464,890 | 8/1984 | Schultissek et al. | 56/17.2 X |
| 4,519,191 | 5/1985 | Ledebuhr et al. | 56/331 |

FOREIGN PATENT DOCUMENTS

| | | |
|---|---|---|
| 0609861 | 12/1960 | Canada . |
| 0638778 | 3/1962 | Canada . |
| 0668287 | 8/1963 | Canada . |
| 0672558 | 10/1963 | Canada . |
| 0724370 | 12/1965 | Canada . |
| 0102113 | 3/1966 | Canada . |
| 0733269 | 5/1966 | Canada . |
| 0749625 | 1/1967 | Canada . |
| 0764174 | 8/1967 | Canada . |
| 0778224 | 2/1968 | Canada . |
| 0783881 | 4/1968 | Canada . |
| 0798585 | 11/1968 | Canada . |
| 0811939 | 5/1969 | Canada . |
| 0828424 | 12/1969 | Canada . |
| 0860596 | 1/1971 | Canada . |
| 0880628 | 9/1971 | Canada . |
| 0901817 | 6/1972 | Canada . |
| 0916932 | 12/1972 | Canada . |
| 0942071 | 2/1974 | Canada . |
| 0950685 | 7/1974 | Canada . |
| 0959656 | 12/1974 | Canada . |
| 0988724 | 5/1976 | Canada . |
| 1019960 | 11/1977 | Canada . |
| 1023634 | 1/1978 | Canada . |
| 1078192 | 5/1980 | Canada . |
| 1097086 | 3/1981 | Canada . |

APPARATUS FOR HARVESTING BERRIES ON LOW PLANTS

This application is a continuation-in-part of copending application Ser. No. 753,524 filed July 10, 1985, now U.S. Pat. No. 4,862,683.

BACKGROUND OF THE INVENTION

This invention relates to improved apparatus for harvesting berries on low plants and in particular is directed to apparatus for harvesting strawberries.

Over the past many years strawberries have been picked using manual labor. The strawberries are simply picked by hand in suitable containers; however this slow, tedious procedure is not well suited for commercial operations. In certain areas, the demand for manual labor during the relatively short picking season has placed a strain on the available labor pool. Current labor rates also place a strain on profit margins so therefore the need has arisen for apparatus capable of harvesting a substantial acreage of berries per unit of time in an acceptable manner.

As described in the above-noted application Ser. No. 753,524 experimental work was carried out at the University of Maine a number of years ago in an effort to develop a commercial blueberry harvester. The picking head there developed was incorporated into a harvesting machine which is described in Canadian Patent No. 961,275 issued Jan. 21, 1975 naming Charles G. Burton as inventor. Although a substantial amount of work went into this machine in an effort to make it work properly, such efforts, at least in part, were considered unsuccessful by those skilled in the art and the machine was not a commercial success. The machine was incapable of withstanding the rugged conditions encountered during use, was prone to damage, and did not pick nearly as efficiently as was initially predicted.

The apparatus described in the above-noted application Ser. No. 753,524 overcomes many of the problems of the prior art machines and has been a significant success in the harvesting of blueberries. Although the above-noted application predicts that similar equipment can be used with strawberries, successful picking apparatus has not yet become commercially available so far as is known.

SUMMARY OF THE INVENTION

It is an object of the present invention to provide improved apparatus for harvesting berries on low plants, especially strawberries. A further object is to provide apparatus for efficiently picking strawberries with fairly small damage to the berries. A further object is to provide harvesting apparatus which can be connected to and powered from a wide range of conventional farm tractors. A further object is to provide a harvester of the type described which is rugged and durable and at the same time reasonable in cost.

The apparatus for harvesting berries on low plants as described in the above-noted application Ser. No. 753,524 typically comprises a picking head including a frame movable along the ground over the crop of berries in the path of travel. A reel is mounted on this frame for rotation about an axis transverse to the travel path. This reel includes a series of circumferentially spaced rows of tines capable of moving and engaging the berries to strip them from the plants. A cam arrangement is provided for moving the tines relative to the reel to facilitate the stripping action and to facilitate deposit of the stripped berries into the reel. A conveyor system is provided to carry the berries which have been deposited into the reel outwardly of same and thence ultimately into a container.

Strawberry harvesting apparatus according to the present invention also incorporates the basic features noted above. In addition, it includes specially modified tines and tine bars to accommodate the picking of strawberries. Tine shapes and spacings have been selected on the basis of experimental work to provide good overall results. The cam shape has been changed and reel rotation direction reversed from that used in the blueberry harvester. The brushes for clearing the tines have been re-located and an auxiliary brush has been installed to overcome a problem arising from use on strawberries. The picking head has been mounted on multiple wheels so as to roll along the ground and the picking head, in common with the harvester of application Ser. No. 753,524, is desirably towed alongside the tractor with substantial freedom of movement to accommodate any unevenness in the ground. Other features will become apparent from the following description of preferred embodiments.

The strawberry harvester preferably includes a hoisting lever arranged to be pivotally connected at an inner end of same to the tractor and a hydraulic ram is connected to it for raising and lowering the lever. Suitable means are provided for connecting the outer end of the lever to the picking head such that the picking head may be lifted up and lowered downwardly together with the lever.

Hydraulic motor means are preferably provided for driving the reel and the conveyor means. The hydraulic motors together with suitable control valves readily enables the rotational speed of the reel to be adjusted relative to the rate of travel of the picking head along the ground thereby to optimize the stripping action.

Additional features of the invention will become apparent from the following detailed description of a preferred embodiment of the invention. In view of the similarities between the harvester of parent application Ser. No. 753,524 and the strawberry harvester of the present invention, a complete description of the harvester in Ser. No. 753,524 will be given, followed by a description of the preferred embodiment of the strawberry harvester.

BRIEF DESCRIPTION OF THE VIEWS OF DRAWINGS

DETAILED DESCRIPTION OF PREFERRED EMBODIMENT

Figure 1:
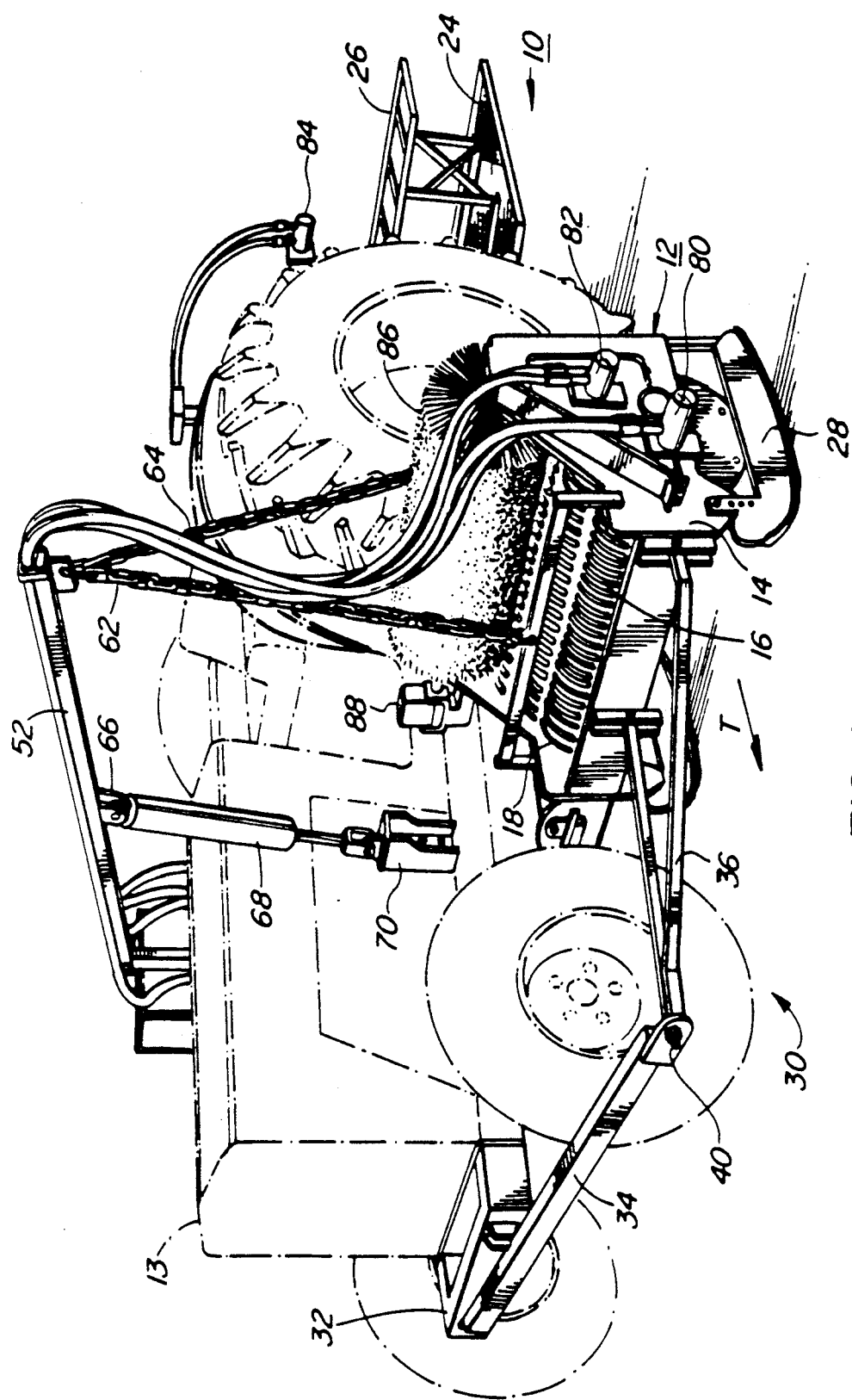
FIG. 1 is a perspective view of the berry harvesting apparatus of application Ser. No. 753,524 with the conventional farm tractor being shown in phantom.
Figure 2:
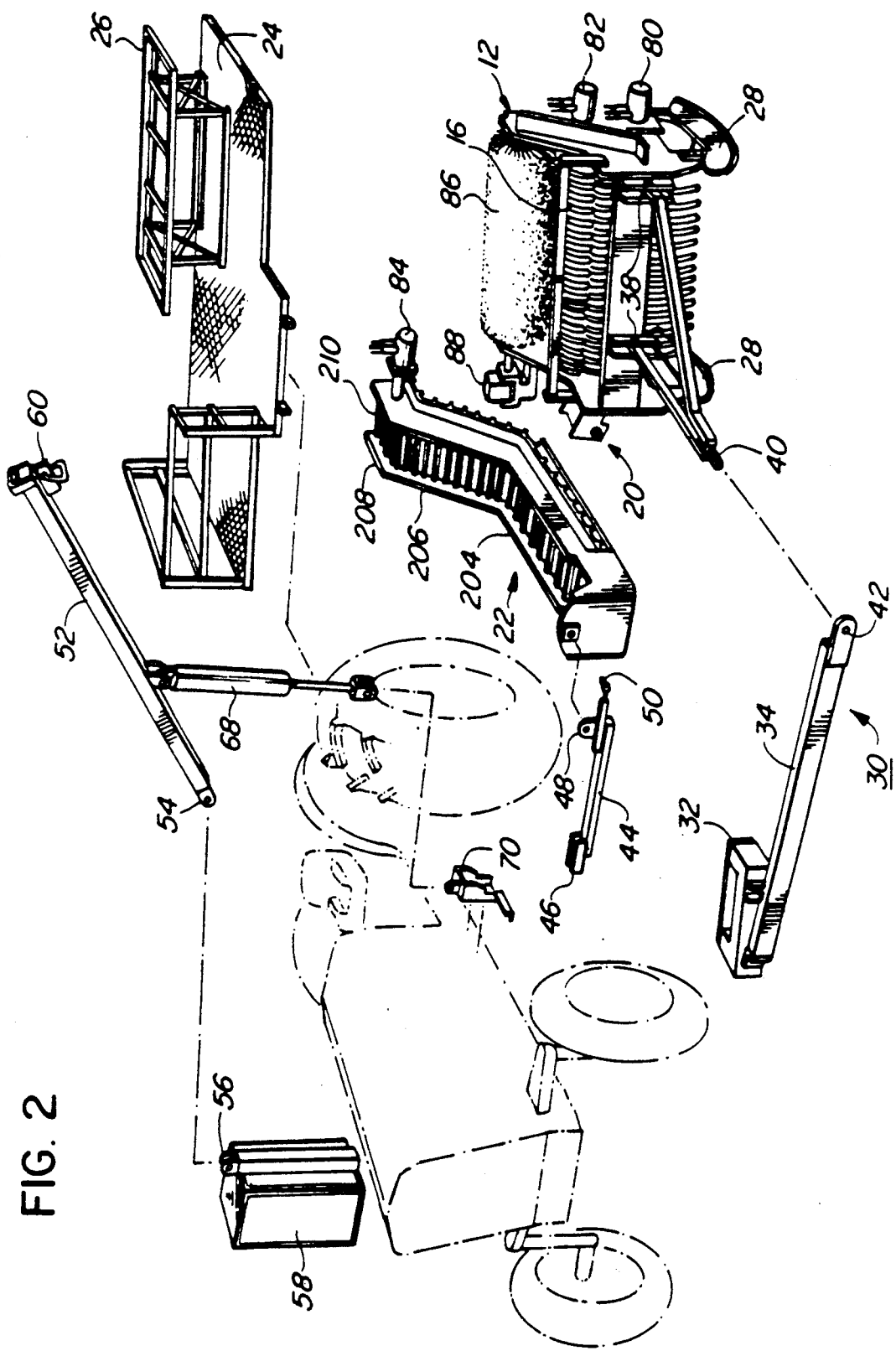
FIG. 2 is an exploded perspective view of the harvesting apparatus of application Ser. No. 753,524.
Figure 3:
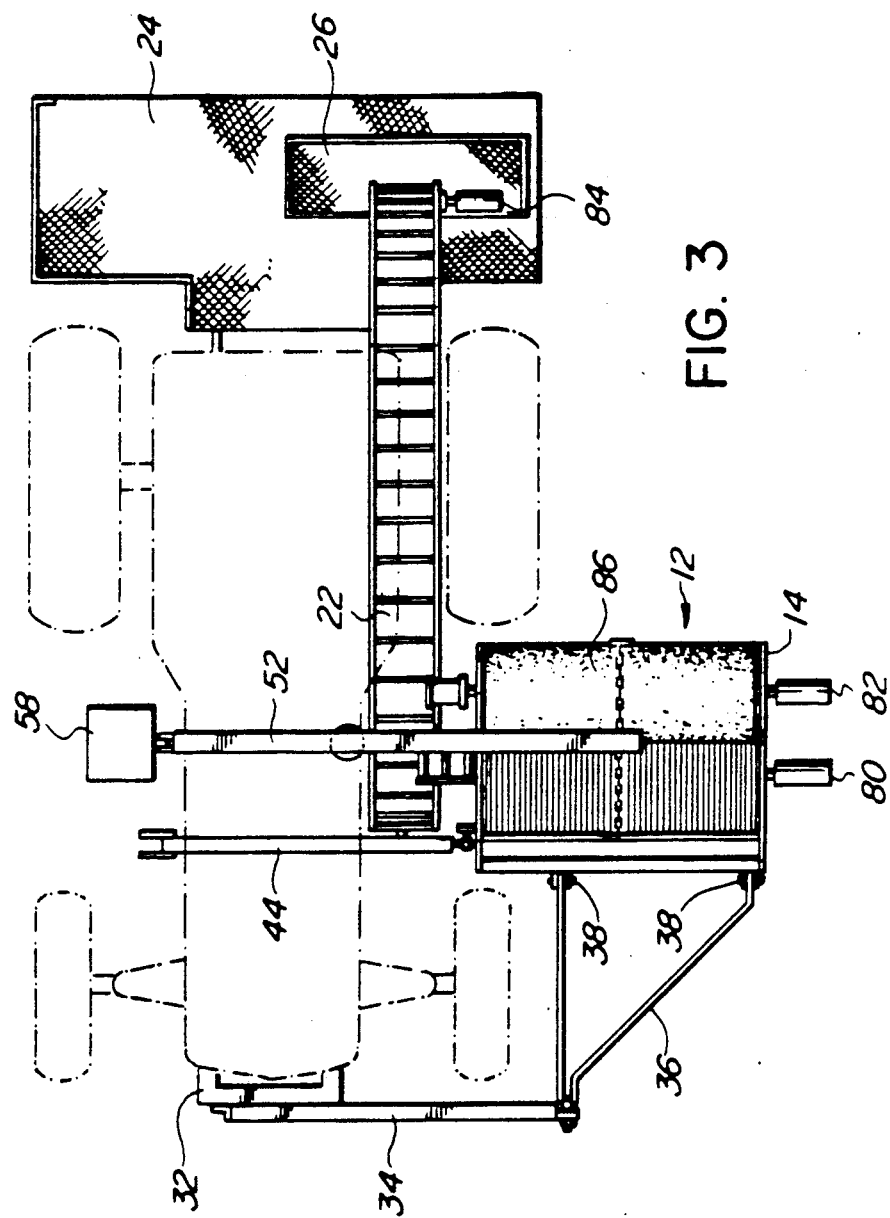
FIG. 3 is a plan view thereof.

Referring now to the drawings there is shown at FIGS. 1–3 a harvester 10 (as described and claimed in parent application Ser. No. 753,524) including a picking head 12 located alongside a conventional farm tractor 13. (shown in phantom).

The picking head includes a frame 14 which is movable along the ground over the crop of berries in a path of travel given by the arrow T, such picking head including a reel 16 mounted on frame 14 for rotation about an axis transverse to the path of travel. Reel 16 is provided with a series of circumferentially spaced row of tines 18 adapted to move and to engage the blueberries to strip them from the plants. The picking head also includes a cam arrangement (to be described hereafter) for moving the tines 18 relative to the reel 16 to facilitate the stripping action and to facilitate deposit of berries into the reel. A primary conveyor arrangement 20 extending inside of the reel 16 serves to carry the berries outwardly of the reel and to deposit same into a secondary conveyor 22, the latter extending rearwardly and thence upwardly and outwardly of the rear end of the tractor.

A horizontal platform 24 is mounted at the rear of the tractor and includes suitable brackets thereon for connection to the hydraulically activated tractor hitch points (not shown). This permits the platform to be raised or lowered. The platform 24 includes a raised subplatform 26 upon which suitable containers (not shown) may be positioned thereby to receive berries passing rearwardly, upwardly and thence outwardly on the secondary conveyor 22.

The picking head frame 14 is provided with a laterally spaced apart pair of skids 28 which, during use, serve to support the picking head 12 directly on the ground for sliding movement thereover. Hence, during operation, the picking head 12 closely follows the contours of the ground.

The harvesting apparatus also includes a mechanism 30 for towing the picking head 12 such that the picking head is free to move upwardly or downwardly and to pitch and roll as the spaced apart skids 28 move over irregularities on the ground surface. This freedom of the picking head to move in such a way as to closely follow the ground contour is most important to a successful picking operation.

The above-noted towing mechanism 30 includes a bracket 32 adapted to be fixed to the front end of the tractor with a towing arm 34 extending laterally outwardly beyond the front wheel of the tractor. A towing yoke 36 is pivotally connected to the picking head 12 at spaced apart pivot points 38 which permit relative pitching motion between the yoke 36 and picking head 12 about a horizontal axis transverse to the path of travel. Additionally, the front end of the yoke 36 is connected at a single point to the arm 34. This single point connection is provided by a forwardly extending stud 40 on the towing yoke which extends through aperture 42 provided in a bracket secured to the outer end of towing arm 34 with a suitable lock nut being secured on stud 40. By virtue of this single point connection the yoke 36 is permitted to have relative rolling motion and pivotal motion with respect to the arm 34. However, in order to prevent substantial lateral deviation of the picking head 12 relative to the tractor, a stabilizer bar 44 extends laterally below the mid point of the tractor to a bracket (not shown) located on the other side of the tractor to which the inner end 46 of the stabilizer bar is pivotally attached. The opposite end of stabilizer bar 46 is pivotally secured at pivot point 48 to the frontal end of the frame of the secondary conveyor 22 and also via a pivot member 50 to a pivot bracket located at the inner end of picking head 12.

With continued reference to FIGS. 1–3, a hoisting lever 52 is pivotally connected at its inner end 54 to an upstanding bracket post 56 fixedly secured to the tractor. Also secured to post 56 is a reservoir tank 58 which holds the hydraulic oil for the lift system and hydraulic motors. The outer end 60 of hoisting lever 52 is connected via fore, and aft chains 62 and 64 respectively to front and rear portions respectively of the picking head 12 as best illustrated in FIG. 1. Intermediate portion of lever 52 is provided with a bracket 66 which is pivotally connected to hydraulic cylinder 68. The ram of the hydraulic cylinder is pivotally connected to bracket 70 secured firmly to the tractor. Hence, as the ram of cylinder 68 is extended and retracted, the lever 52 is raised and lowered with the picking head 12 being raised and lowered accordingly.

It should be noted here that the fore and aft chains 62 and 64 are arranged such that as hoisting lever 52 is raised upwardly, the frontal portion of the picking head 12 is initially lifted so as to cause the picking head 12 and its supporting skids 28 to rotate rearwardly thereby to assist the skids in clearing obstructions on the ground. This can be easily achieved by adjusting the relative lengths of chains 62 and 64 i.e. by making chain 62 relatively shorter than chain 64.

Figure 4:
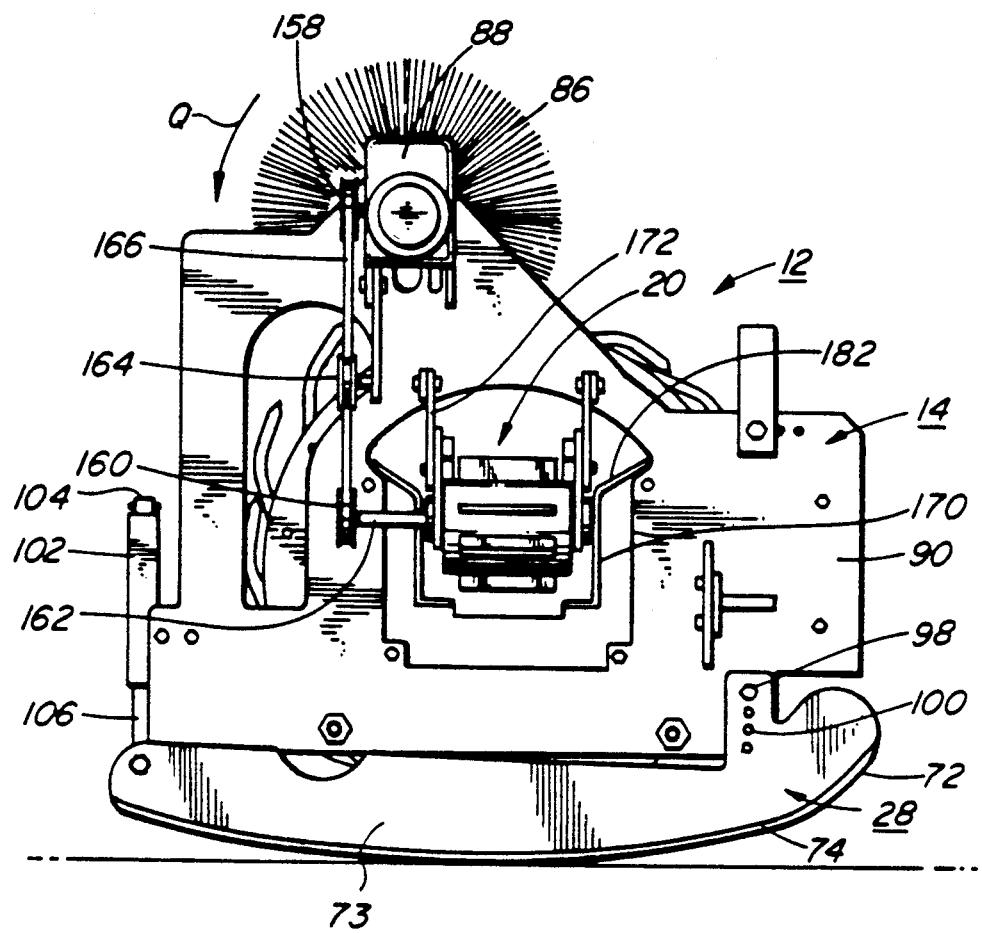
FIG. 4 is an elevation view of the inner end of the picking head.

The profile shape or contour of the supporting skids 28 is best illustrated in FIG. 4. It will be noted that the frontal portion 72 of each skid is smoothly convexly contoured in a relatively pronounced manner. This frontal section 72 merges into a more shallowly convexly curved intermediate and rear section 73. The smoothly convexly curved contour arrangement of the skids 28 substantially prevents digging in of the front portions of the skids in rough terrain and at the same time encourages the to and fro pitching movement of the picking head 12 as humps and hollows in the terrain are encountered. Additionally, the lower edges of skids 28 are each provided with a skid plate 74 of sufficient width as to prevent digging in of the skids during movement over the usual surfaces encountered during use and at the same time they prevent overly rapid wear of the skids during use.

The farm tractor is equipped with a suitable commercially available hydraulic pump (not shown) which supplies, via flexible lines and suitable commercially available control valves (not shown) the hydraulic motors 80, 82 and 84.

Hydraulic motors 80 and 82 are mounted on the outer end of the picking head frame 14 while hydraulic motor 84 is mounted to the rear end of the frame of the secondary conveyor 22. Motor 80 serves to drive reel 16 in rotation about its axis by way of a chain and sprocket drive to be described hereafter. Hydraulic motor 82 serves to drive elongated tine cleaning brush 86 in rotation about its axis, with the latter serving to drive, via gear reduction unit 88 on the inner end of picking head frame 14, the primary conveyor 20.

With reference now to FIGS. 4 through 13, the picking head 12 will now be described more fully.

Figure 5:
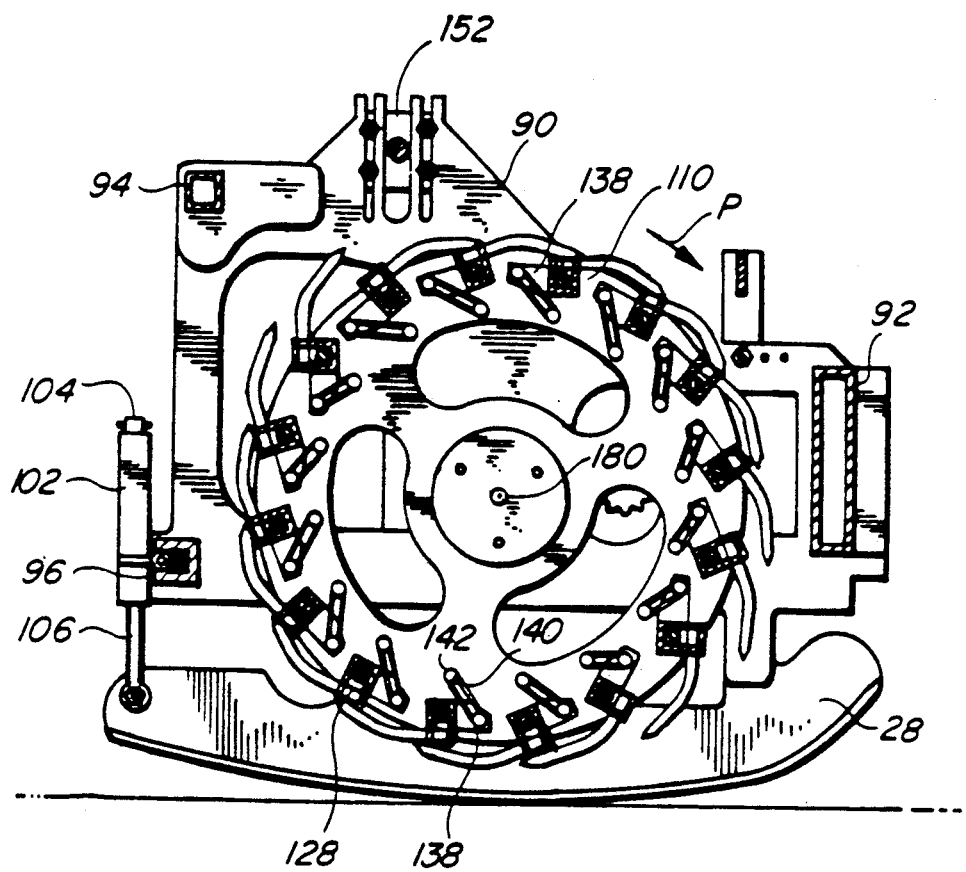
FIG. 5 is a cross-section view of the picking head looking toward the outer end of the reel.
Figure 6:
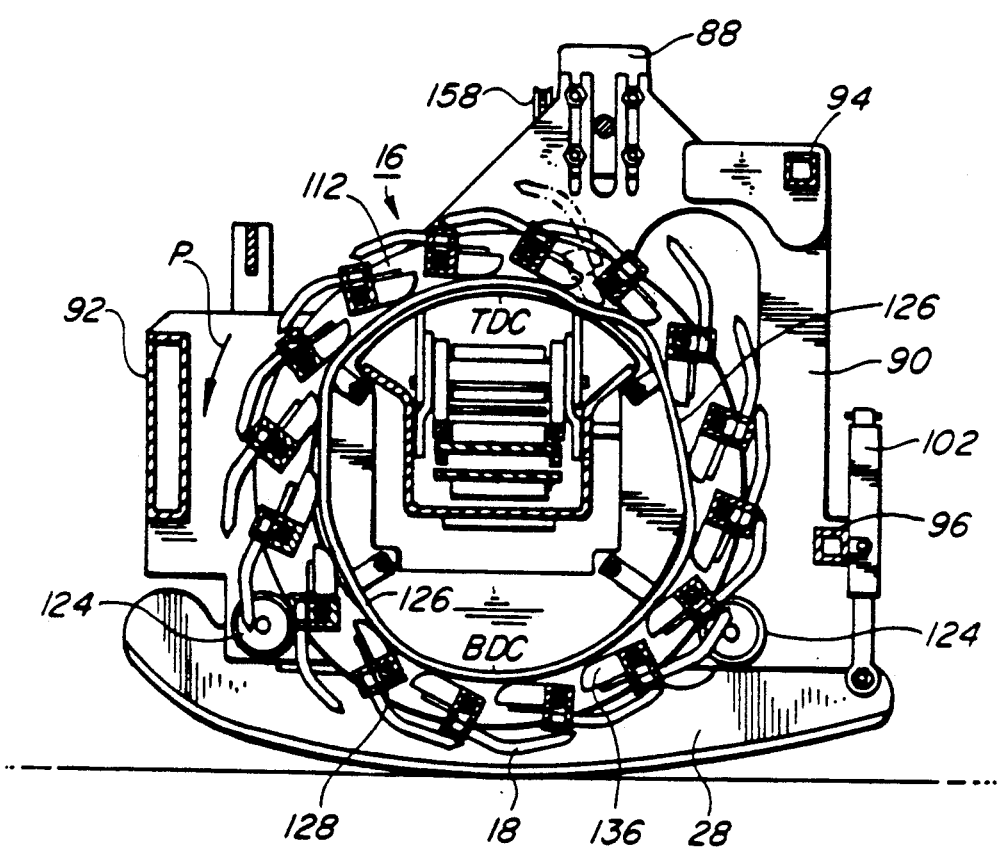
FIG. 6 is a view similar to that of FIG. 5 but looking toward the opposite end of the picking reel.

The previously mentioned picking head frame 14 includes a spaced apart parallel pair of side plates 90 which are rigidly secured together in spaced apart relationship by transversely extending cross-frame members 92, 94 and 96 as shown in FIGS. 5 and 6 for example. Each of the previously described skids 28 is connected adjacent a lower edge of a respective side plate 90 with the frontal portion of each skid 28 being connected to side plate 90 via bolt 98 with a series of adjustment holes 100 being provided in each skid 28 to allow for a height adjustment to be made at the front end of the skid. The rear end of each skid 28 is connected to the frame 14 via cross-member 96 and a height adjustment device 102. Height adjustment device 102 is provided with internal threads (not shown) such that when the upper end portion 104 of same is rotated by a suitable wrench, the support element 106 telescopes inwardly or outwardly of device 102 thus effecting a rear end height adjustment in a rapid and convenient manner.

The reel 16 is rotatably mounted within frame 14, the reel 16 including opposed end plates 110 and 112 as best seen in FIGS. 5 and 6. Both end plates 110 and 112 have a circular outline and end plate 110 is journalled in hub 112 affixed to a frame side plate 90 (see FIG. 7). A short shaft section extending outwardly from the center of reel end plate 110 and through hub 112 has a drive sprocket 114 keyed thereto, such sprocket being driven in rotation by hydraulic motor 80 via sprocket 116 and roller-link drive chain 118. Hydraulic motor 80 is mounted on a bracket 120 secured to frame side plate 90 with the other hydraulic motor 82 also being mounted to an extension portion of that bracket.

Figure 7:
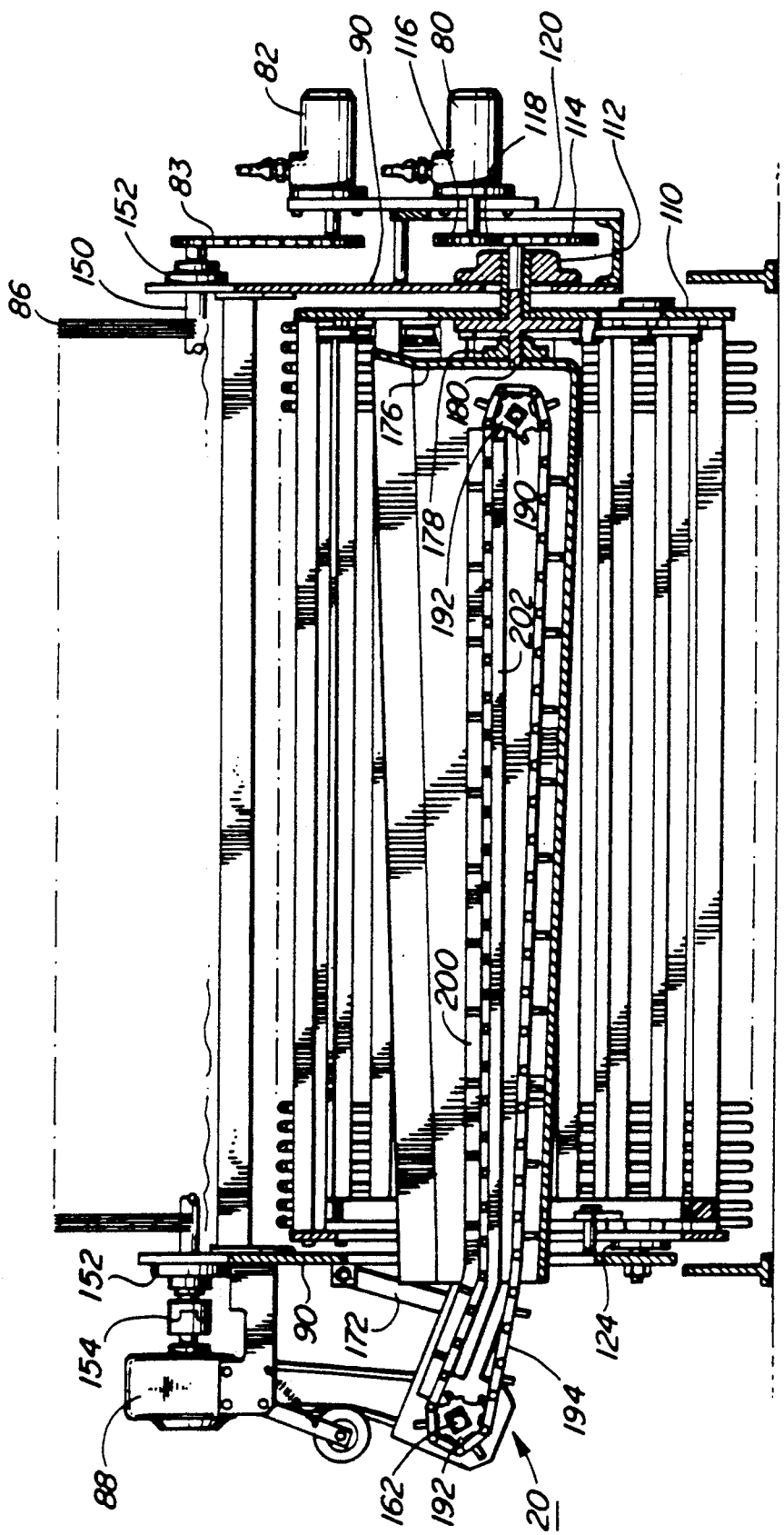
FIG. 7 is a longitudinal section view of the picking head.

As is best seen in FIGS. 4, 6 and 7, the primary conveyor 20 extends axially within the reel and outwardly through one end of same. In order to accommodate this primary conveyor 20, the opposite reel end plate 112 must have an open center. Accordingly, in order to rotatably support reel end plate 112, a pair of rollers 124, journalled on suitable needle bearings, are mounted adjacent the lower edge of the frame side plate 90 associated with reel end plate 112. These rollers contact lower peripheral edge portions of the reel end plate thus securely supporting same during rotation of the reel 16. This same frame end plate 90 also has bolted to it a ring-like cam 126. This cam 126 serves to provide for opening and closing of the tines in a manner which will now be described more fully.

Figure 12:
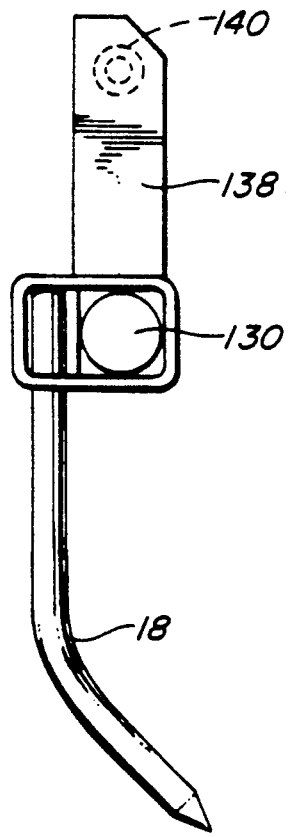
FIGS. 12 and 13 are opposite end views of a tine bar.
Figure 13:
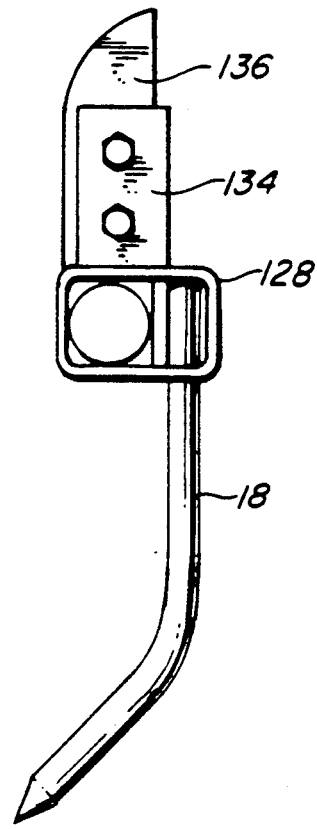

It should be noted that the individual tines 18 are mounted in spaced parallel relation on elongated tine bars 128 which extend across from one reel end plate 110 to the other reel end plate 112. Each tine bar comprises a tubular member of generally rectangular cross-section as best seen in FIGS. 12 and 13, each tine bar being drilled at spaced intervals to receive the ends of the tines 18 which are then welded relative to their associated tine bars 128. Elongated tine bar support rod 130 extends through the center of each tine bar 128. The opposing ends of each support rod 130 are drilled and tapped to receive threaded studs 132, the latter passing through peripherally spaced apertures provided adjacent the outer peripheries of each of the reel end plates 110 and 112. Accordingly the peripherally spaced support rods 130 serve to rigidly secure the reel end plates 110 and 112 in their parallel spaced apart relationship while at the same time providing support for the tine bars 128 and also allowing the tine bars 128 to rotate thereon thus allowing the tine sets mounted to each tine bar to open and to close during rotation of reel 16 thereby to facilitate the berry stripping action etc. It will be appreciated here that the tines 18 are spaced apart just sufficiently as to allow the berries to be stripped from the plants. A typical tine 18 as illustrated may have a total length in the order of 5½" and a 5/16" diameter, with the outer portion of the tine bent at approximately a 45 degree angle to the shank of the tine. These tines are typically spaced along the tine bar 128 with a 17/32" center to center spacing. The tine tips are pointed as shown in FIGS. 12 and 13.

Each tine bar 128 is provided with a cam follower as best shown in FIG. 13 comprising a bracket 134 to which is bolted a smoothly contoured follower body 136 made of a low-friction material such as ultra high molecular weight polypropylene. The opposite end of each tine bar is provided with a short lever 138 welded thereto and provided with short stud 140 at its outer end.

Figure 9:
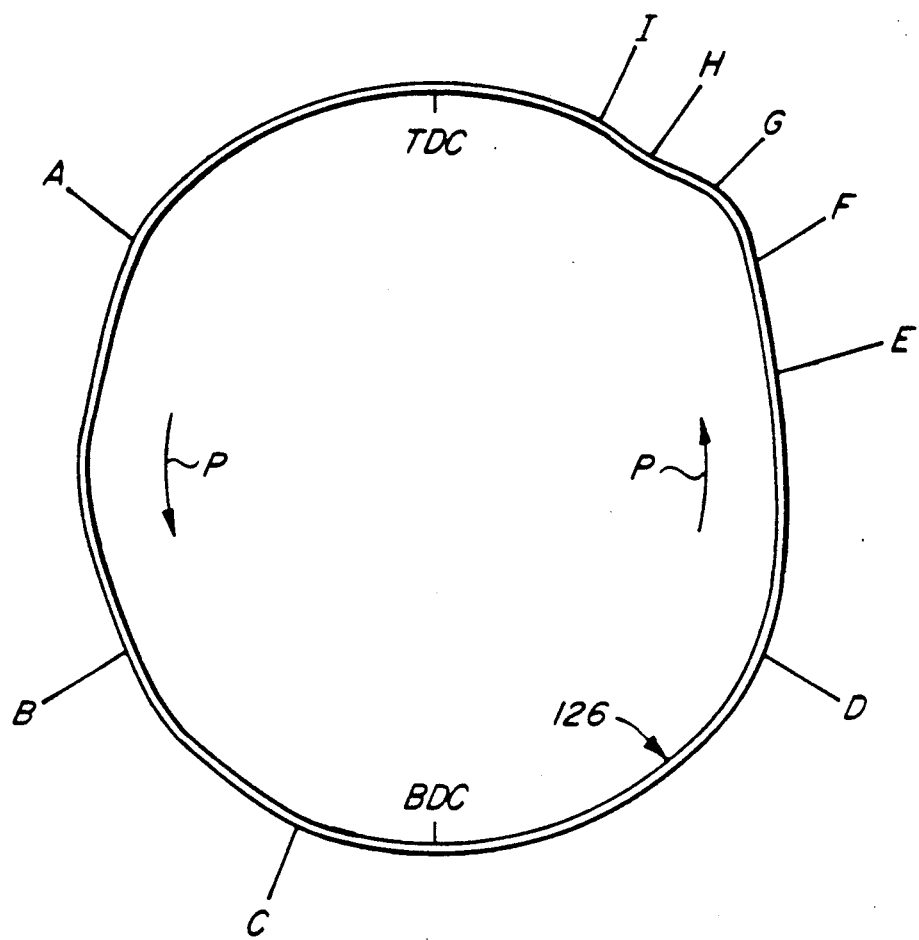
FIG. 9 illustrates the cam for moving the tines.

Referring now to FIG. 6, the reel end plate 112 is shown together with the peripherally spaced apart tine bars 128 and their attached sets of tines 18. As previously noted each tine bar is provided with a cam follower 136 which closely engages the periphery of the previously noted cam 126 which is fixed relative to the frame end plate 90. With reference to FIG. 5 the opposite reel end plate 110 is illustrated along with the peripherally spaced tine bars 128 each being provided adjacent the end of same with a short lever 138. The studs 140 at the outer ends of these levers each have a sturdy elastic band 140 connected thereto, each elastic band 140 also passing around an associated pin 142 mounted in the plate 110. The strong elastic bands 140 serve to bias the cam followers 136 into close contacting relationship with the periphery of the ring-like cam 126. Therefore, as the reel 16 rotates in the direction of arrow P as shown in FIGS. 5 and 6, with the cam followers 136 in contact with the cam 126, the tine bars 128 are made to pivot about their respective support rods 130 in the predetermined cyclical fashion as determined by the shape or contour of cam 126 thereby causing the sets of tines on the respective tine bars 128 to open and close to facilitate the berry stripping action and to ensure that the stripped berries are conveyed upwardly and subsequently directed into the central portion of the reel onto the axially extending primary conveyor 20. The particular movement imparted to the sets of tines 18 is illustrated in FIG. 9 which illustrates the shape of the ring-like cam 126. The direction of rotation of reel 16 relative thereto is given by the arrows P. The letters TDC and BDC represent the top dead center and bottom dead center positions respectively of the tines.

With continued reference to FIG. 9, it will be assumed that a particular set of tines 18 has rotated past the TDC position and is moving toward position A. During the course of this movement the tines 18 are essentially in their closed positions. However, beginning at point A, the shape of cam 126 begins to change with the result being that the tines 18 open slowly toward point B. This gradual opening motion, combined with the forward motion of the harvester as a whole, permits the tines to enter into and engage the plants with relatively little disturbance. However, after point B is reached the tines 18 gradually close with the stripping of the berries occurring in this region, with the tines being fully closed by the time point C is reached, such tines 18 remaining closed through the BDC position and thence upwardly to the point D position where the tines begin to open slowly thereby to assist in retaining the berries on the tines 18 and tine bars 128 and preventing premature deposition of the berries into the central portion of the reel. After point E is reached however tines 18 begin to close slowly until point F is reached and between points F and G the tines close rapidly followed by rapid opening between points G and H followed again by rapid closure between points H and I. This rapid close-open-close motion serves to overcome the effects of centrifugal forces on the berries and to positively throw same onto the primary conveyor 20 within the reel and the rapid opening action serves to release any berries which may be momentarily stuck between the tines.

In a typical embodiment of the invention the above-described tine bars 128 are peripherally spaced about a circle having a diameter of, for example, 20 inches. The harvester ground speed is typically in the order of 2 miles per hour. The reel 16 is driven by hydraulic motor 80 in an overspeed condition such that each blueberry plant is successively raked by a multiplicity of sets of tines e.g. each plant is preferably raked about three times over. This helps to ensure an effective and efficient stripping of the berries.

In order to clear dirt and debris from the tines during operation, the aforementioned cylindrical brush 86 rotates in contact with the tines 18 during the period of time that the closed tines are moving over the TDC position shown in FIG. 9. Thus as brush 86 rotates in a direction of arrow Q shown in FIG. 4, pieces of plant material are effectively removed from the tines and flung away to a point where they will cause no further problems. This brush is rotated by hydraulic motor 82 via chain and sprocket mechanism 83 at a speed of between 500 and 800 RPM. The shaft 150 of brush 86 is journalled adjacent its opposing ends in bearing blocks 152, the latter being mounted adjacent the upper edges of the frame end plates 90 in slotted guideways permitting shaft 150 to be adjusted upwardly or downwardly thereby to provide for the correct amount of brush to tine contact. In a typical embodiment the brush is provided with a 12" outside diameter and a 2" diameter core. The brush may of the spiral wound variety (such as is typically used in street cleaning equipment) and the bristles are typically of medium density polypropylene having a diameter of 0.060 inch.

The inner end of shaft 152, which supports brush 86, is connected via coupling 154 to the right angle gear drive 88, the latter being mounted via a bracket to the frame end plate 90. The right angle gear drive 88 includes a pulley 158 (see FIG. 4) which drives a further pulley 160 secured to shaft 162 journalled in the outer end of the frame of the primary conveyor 20. A spring biased idler pulley 164 holds the V-belt extending between pulleys 158 and 160 in tension, such V-belt being designated by reference 166. Hence, as brush 86 is driven in rotation by hydraulic motor 82, motive power is also supplied via the gear drive 156 and belt 166 etc. to the belt of the primary conveyor 20.

Referring now particularly to the primary conveyor 20, it will be noted that the same includes an elongated somewhat trough-like metal frame 170. The outer end of conveyor frame 170 is suspended from frame end plate 90 by way of a pair of support brackets 172 (see FIG. 4). Since the opposite end of conveyor frame 170 is located entirely within the rotating reel 16, special means must be provided for its support. Therefore, in order to accomplish this, the inner end wall 176 of the conveyor frame is provided with a bearing hub 178 within which is journalled a stub shaft 180 concentric with and mounted to the reel end plate 110 as best seen in FIGS. 5 and 7. Hence, by virtue of this arrangement, rotation of the reel 16 is permitted while at the same time the inner end of the conveyor frame 170 is securely supported by the stub shaft 180 located within bearing hub 178 attached to the end wall of the conveyor frame.

In order to facilitate entry of berries into the primary conveyor 20, the conveyor frame 170 is provided with opposing side walls, the upper portions of which, designated 182, flare upwardly and outwardly into relatively close proximity to the circumferentially spaced apart tine bars 128. In order to avoid problems arising from mechanical interference, the outwardly flaring sidewalk portions 182 are provided adjacent their extremities with flexible strip portions which come in very close proximity with the tine bars thus assisting in ensuring that all of the berries deposited into the reel in the manner described previously are captured by the primary conveyor.

Figure 10:
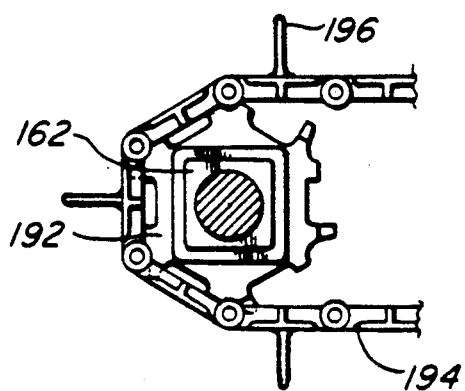
FIG. 10 is a view illustrating a portion of the conveyor belt and drive sprocket therefor.
Figure 11:
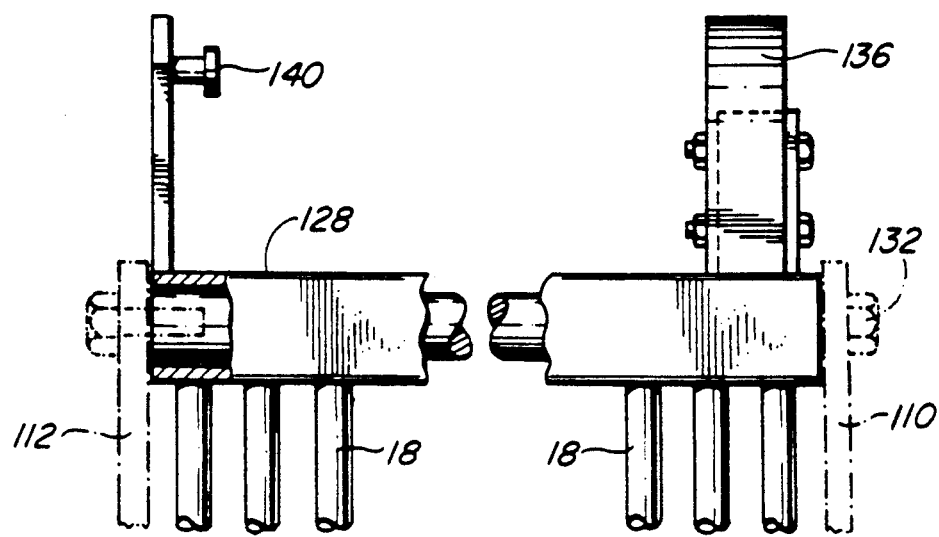
FIG. 11 is a fragmentary view of a tine bar and the manner of mounting same.

With reference again to FIG. 7, it was previously noted that the primary conveyor 20 includes an outer drive shaft 162 journalled by a suitable bearings in the outermost end of the conveyor frame 170. Adjacent the opposite end of the conveyor frame there is provided a rotatable idler shaft 190. These shafts are each provided with an axially spaced apart pair of sprockets 192 which engage an elongated endless conveyor belt 194 which is preferably of the type made by Intralox, Inc. of New Orleans, U.S.A. A short segment of such belt is illustrated in FIG. 10 along with the sprocket 192. The belt is comprised of short modules or sections hinged together to provide the necessary degree of flexibility. In the arrangement shown, every second section is provided with a flight 196 to positively engage and move the berries along the conveyor. The sprockets, as shown in FIG. 10, are specially shaped so as to accommodate the modular design of the belt and the sprockets of course provide for positive drive of the belts. The sprockets have square bores which are mounted with some clearance on the square sectioned shafts thereby to allow axial movement of the sprockets in response to dimensional changes resulting from temperature fluctuations etc. As best seen in FIG. 7, the upper run of conveyor belt 194 is confined at its opposed marginal edges between elongated vertically spaced apart plastic strips 200 and 202 which are firmly attached to the opposing side walls of the conveyor frame 170. The opposing ends of the flights 196 on the belt are set inwardly from the marginal edges of the belt thereby to accommodate the guide strips 200, 202. By these means, the upper run of the belt is securely supported and escape of the berries is substantially eliminated as is crushing and bruising of the berries. Because of the positive sprocket drive feature, there is no slippage of the belt as is the case when conventional belts are used especially when crushed berries are present on the belt surfaces.

After the berries emerge from the end of the primary conveyor 20, they are deposited into the secondary conveyor 22 as previously noted. The frame of the secondary conveyor 22 includes a horizontal section 204, an upwardly inclined section 206 and a short horizontally extending rear section 208. The hydraulic drive motor 84 is connected to this rear section 208 and rotates a shaft having sprockets thereon thereby to positively drive the secondary conveyor belt 210. The secondary conveyor belts, sprockets associated therewith, and the means for mounting the upper flight of such belt are all essentially as described previously in conjunction with the primary conveyor 20 and hence there is no need to repeat this description here.

Figure 8:
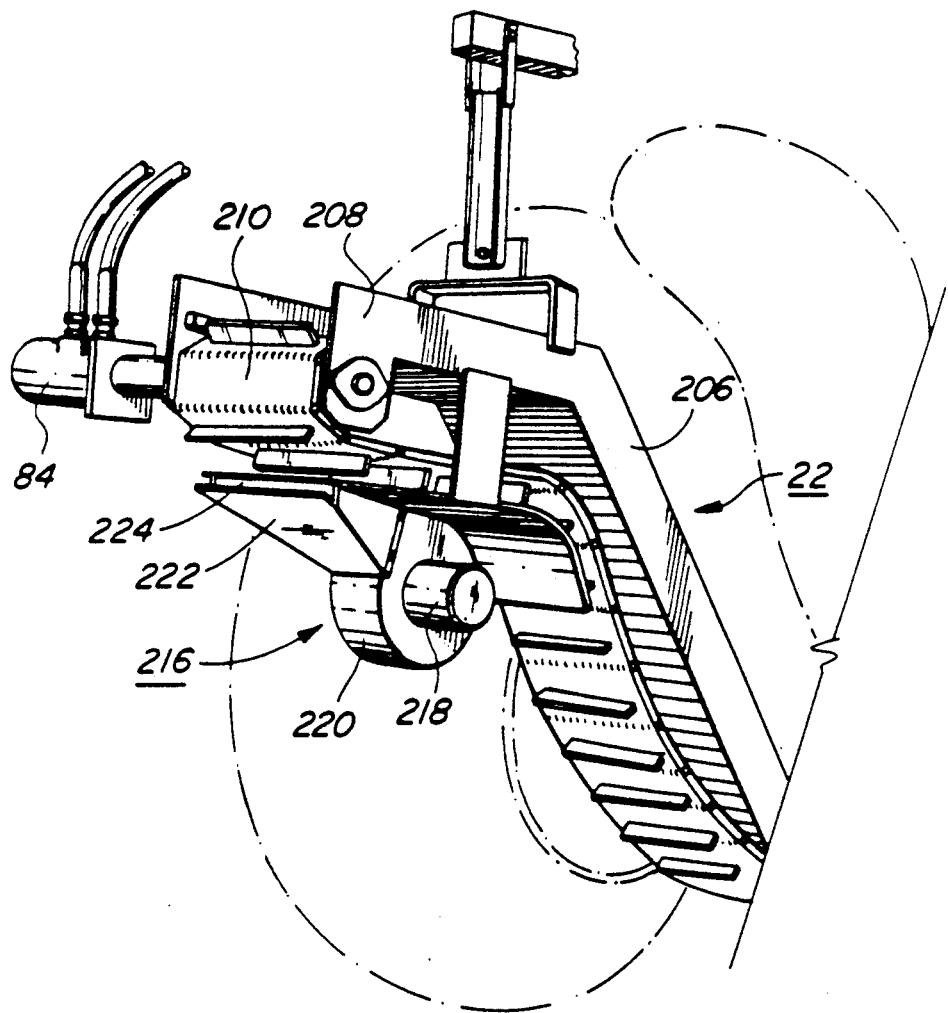
FIG. 8 is a perspective view of the rear end of the conveyor assembly.

Since the berries passing outwardly of the picking head 12 and along the secondary conveyor 22 will be contaminated to some degree with leaves and other foreign material, a small blower arrangement 216 is mounted just below the horizontal rear end section 208 of the secondary conveyor as illustrated in FIG. 8. This blower 216 is driven by a small electric motor 218 and is provided with a fan housing 220 enclosing a centrifugal fan, the output of which is directed through an outlet nozzle 222, the slot-like mouth 224 of which is located just below the extreme terminal end of the belt conveyor 210. Thus, as the berries and debris fall downwardly from the outer end of the secondary conveyor 22, the lighter leaves and other debris are carried away from the falling berries by virtue of the stream of air being emitted from the mouth of nozzle 222. The falling berries are deposited in containers of a convenient size (not shown) which are positioned on the subplatform 26 during operation. An operator positioned on main platform 24 positions the containers as desired and, when suitably filled, stacks them in convenient locations on platform 24.

The operation of the harvester described above will be readily apparent from a review of the foregoing description. When travelling to the picking site the previously described hoisting lever 52 is in the "up" position as also is the picking head 12 thereby allowing for easy transport to the picking area. When the picking area has been reached, hoisting lever 52 is lowered downwardly until the picking head is supported on the ground by way of the previously described skids 28. The several hydraulic motors, 80, 82 and 84 are activated so as to drive reel 16, brush 86 and the primary and secondary conveyors 20 and 22 in the manner described previously. The tractor is then put in its lowest gear and made to move forwardly at slow speed e.g. about 2 miles per hour, with the result being that a swath of berries is picked from the field. In the next picking course the tractor follows the picked swath so as to avoid undue damage and crushing of the berries and the next adjacent swath is picked. During this time, by virtue of the skid mounting arrangement for the picking head, and the unique towing arrangement, the picking head is free to closely follow the contour of the terrain, and to pitch and roll and move upwardly and downwardly as required, thus ensuring that the reel 16 and picking tines 18 are in the desired close proximity to the ground during the picking operation. Since the rate of speed of the hydraulic motors may be closely controlled, variations can be made in the speed of reel rotation etc. thereby to optimize the picking operation.

Although the above-described embodiment of the invention was constructed primarily for the picking of blueberries, it was contemplated in application Ser. No. 753,524 that with suitable modifications the same general principles would apply to the picking of certain other crops such as strawberries.

Accordingly, a suitably modified second embodiment of the harvester is shown at FIGS. 14–18 which has been specially adapted for harvesting of strawberries. Since much of the harvester corresponds to that previously described, emphasis will be placed on the differences and similar features will only be noted briefly, if at all.

Thus, the strawberry harvester 210 of FIGS. 14–18 includes a picking head 212 located alongside a conventional tractor 213 (shown in phantom).

The picking head includes a frame 214 which is movable along the ground over the crop of strawberries in a path of travel given by the arrow T, such picking head including a reel 216 mounted on frame 214 for rotation about an axis transverse to the path of travel. Reel 216 is provided with a series of circumferentially spaced row of tines 218 adapted to move and to engage the berries to strip them from the plants. The picking head also includes a cam arrangement (to be described hereafter) for moving the tines 218 relative to the reel 216 to facilitate the stripping action and to facilitate deposit of berries into the reel. A primary conveyor arrangement essentially the same as that described previously extending inside of the reel 216 serves to carry the berries outwardly of the reel and to deposit same into a secondary conveyor 222, the latter extending rearwardly and thence upwardly and outwardly of the rear end of the tractor.

A horizontal platform 224 is mounted at the rear of the tractor and includes suitable brackets thereon for connection to the hydraulically activated tractor hitch points (not shown). This permits the platform to be raised or lowered. The platform 224 includes a raised subplatform 226 upon which suitable containers (not shown) may be positioned thereby to receive berries passing rearwardly, upwardly and thence outwardly on the secondary conveyor 222.

The picking head frame 214 is provided with laterally spaced apart wheel sets 228 on each side thereof which, during use, serve to support the picking head 212 directly on the ground for rolling movement thereover. Hence, during operation, the picking head 212 closely follows the contours of the ground.

The harvesting apparatus also includes a mechanism 230 for towing the picking head 212 such that the picking head is free to move upwardly or downwardly and to pitch and roll as the spaced apart wheel sets 228 move over irregularities on the ground surface. This freedom of the picking head to move in such a way as to closely follow the ground contour is not as important in strawberry operations as in blueberry picking as the terrain is much smoother as compared with rough blueberry "barrens". However, this freedom of movement is still considered desirable in strawberry operations.

The above-noted towing mechanism 230 includes a bracket 232 adapted to be fixed to the front end of the tractor with a towing arm 234 extending laterally outwardly beyond the front wheel of the tractor. A towing yoke 236 is pivotally connected to the picking head 212 at spaced apart pivot points 238 which permit relative pitching motion between the yoke 236 and picking head 212 about a horizontal axis transverse to the path of travel. Additionally, the front end of the yoke 236 is connected at a single point 240 to the arm 234. By virtue of this single point connection the yoke 236 is permitted to have relative rolling motion and pivotal motion with respect to the arm 234. However, in order to prevent substantial lateral deviation of the picking head 212 relative to the tractor, a stabilizer bar 244 extends laterally below the mid point of the tractor to a bracket 242 located on the other side of the tractor to which the inner end of the stabilizer bar 244 is pivotally attached. The opposite end of stabilizer bar 244 is pivotally secured at pivot point 248 to the frontal end of the frame of the secondary conveyor 222 and also via a pivot member to a pivot bracket located at the inner end of picking head 212 as described in the previous embodiment.

Figure 14:
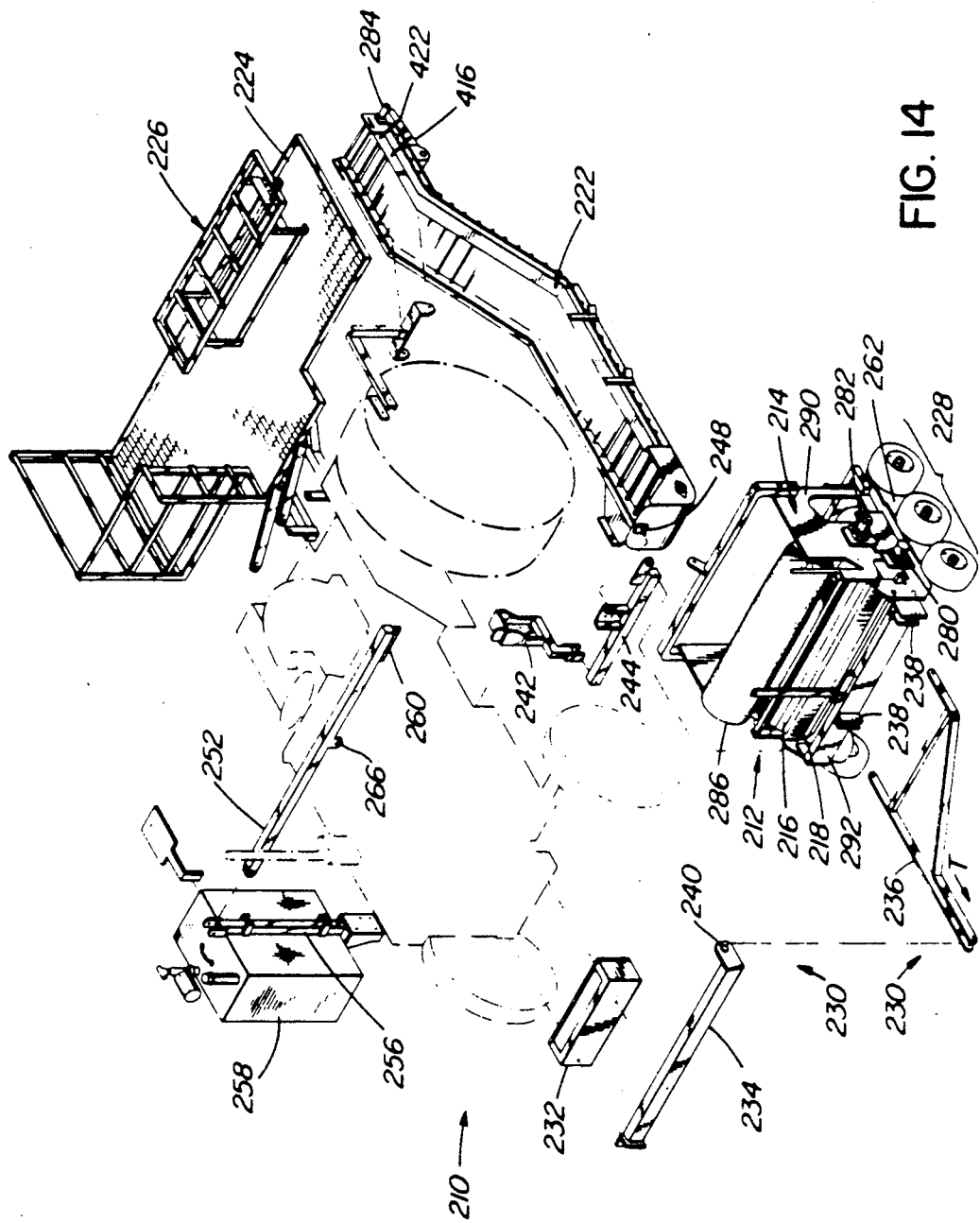
FIG. 14 is an exploded perspective view of a strawberry harvester, generally similar in operating principle and construction to that harvester shown in FIGS. 1–13 above but modified to permit it to effectively harvest strawberries in accordance with the present invention.
Figure 15:
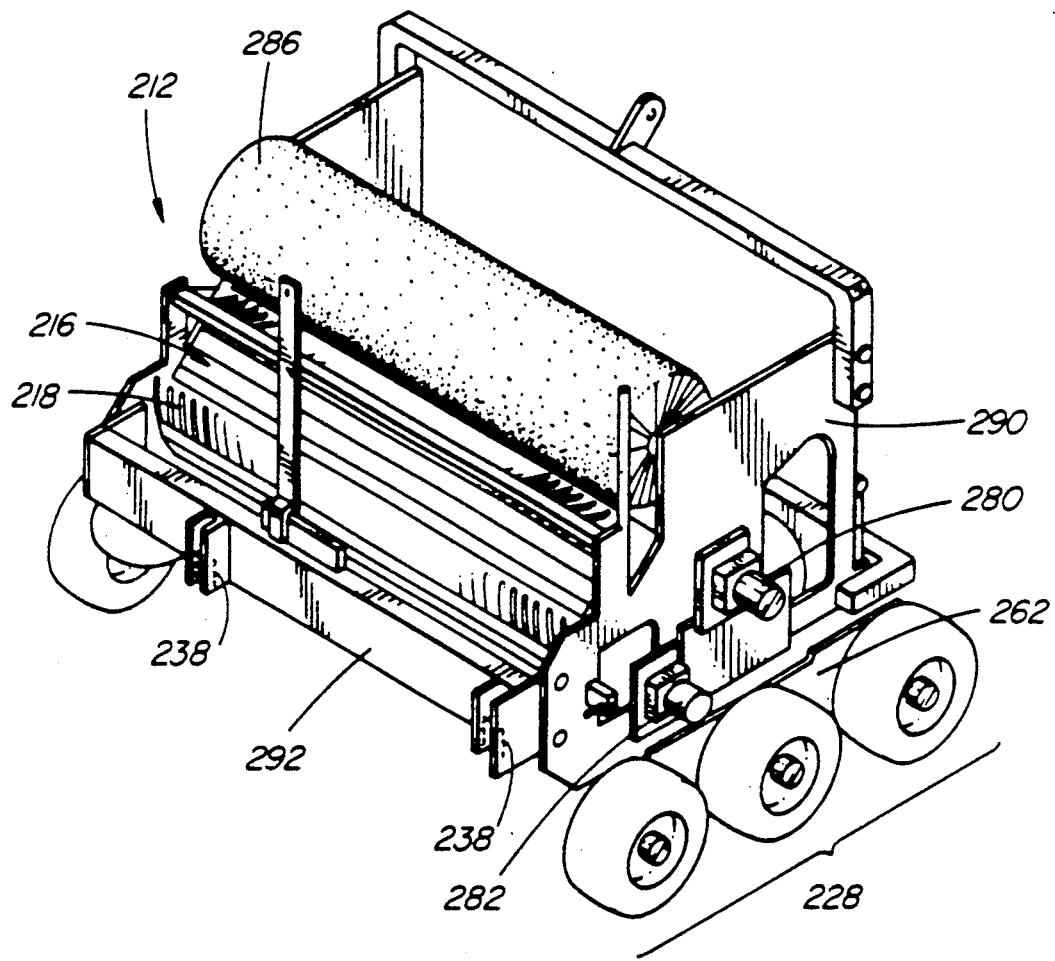
FIG. 15 is an enlarged perspective view of the picking head, per se.

With continued reference to FIGS. 14 and 15, a hoisting lever 252 is pivotally connected at its inner end to an upstanding bracket post 256 fixedly secured to the tractor. Also secured to post 256 is a reservoir tank 258 which holds the hydraulic oil for the lift system and hydraulic motors. The outer end 260 of hoisting lever 252 is connected via suitable linkage means or chains (not shown) to front and rear portions respectively of the picking head 212 as best illustrated in FIG. 14. Intermediate portion of lever 252 is provided with a bracket 266 which is pivotally connected to a hydraulic cylinder as before (not shown). The ram of the hydraulic cylinder is pivotally connected to bracket 242 secured firmly to the tractor. Hence, as the ram of the cylinder is extended and retracted, the lever 252 is raised and lowered with the picking head 212 being raised and lowered accordingly.

It should be noted here that the fore and aft chains or links may be arranged as before such that as hoisting lever 252 is raised upwardly, the frontal portion of the picking head 212 is initially lifted so as to cause the picking head 212 to rotate rearwardly thereby to assist in clearing obstructions on the ground.

The above-noted wheel sets 228 are secured via stub axles (not shown) to respective mounting plates 262 which, in turn, are mounted to the frame 214 of the picking head. The free rolling wheels of the wheel sets are preferably provided with rubber tires of sufficient tread width as to resist sinking on the types of soil normally encountered in strawberry fields.

The farm tractor is equipped with a suitable commercially available hydraulic pump (not shown) which supplies, via flexible lines and suitable commercially available control valves (not shown) the hydraulic motors 280, 282 and 284.

Hydraulic motors 280 and 282 are mounted on the outer end of the picking head frame 214 while hydraulic motor 284 is mounted to the rear end of the frame of the secondary conveyor 222. Motor 280 serves to drive reel 216 in rotation about its axis by way of a chain and sprocket drive to be described hereafter. Hydraulic motor 282 serves to drive an elongated tine cleaning brush 286 in rotation about its axis, with the latter serving to drive, via a gear reduction unit (not shown) on the inner end of picking head frame, the primary conveyor in the same fashion as in the embodiment of FIGS. 1–13.

With reference now to FIGS. 15 through 18, the picking head 212 will now be described more fully.

The previously mentioned picking head frame 214 includes a spaced apart parallel pair of side plates 290 (in phantom in FIG. 16) which are rigidly secured together in spaced apart relationship by transversely extending cross-frame members as in the previously described embodiment. Each of the previously described mounting plates is connected adjacent a lower edge of a respective side plate 290 by a height adjustment arrangement similar to that provided for the skids 28 of the previous embodiment.

Figure 16:
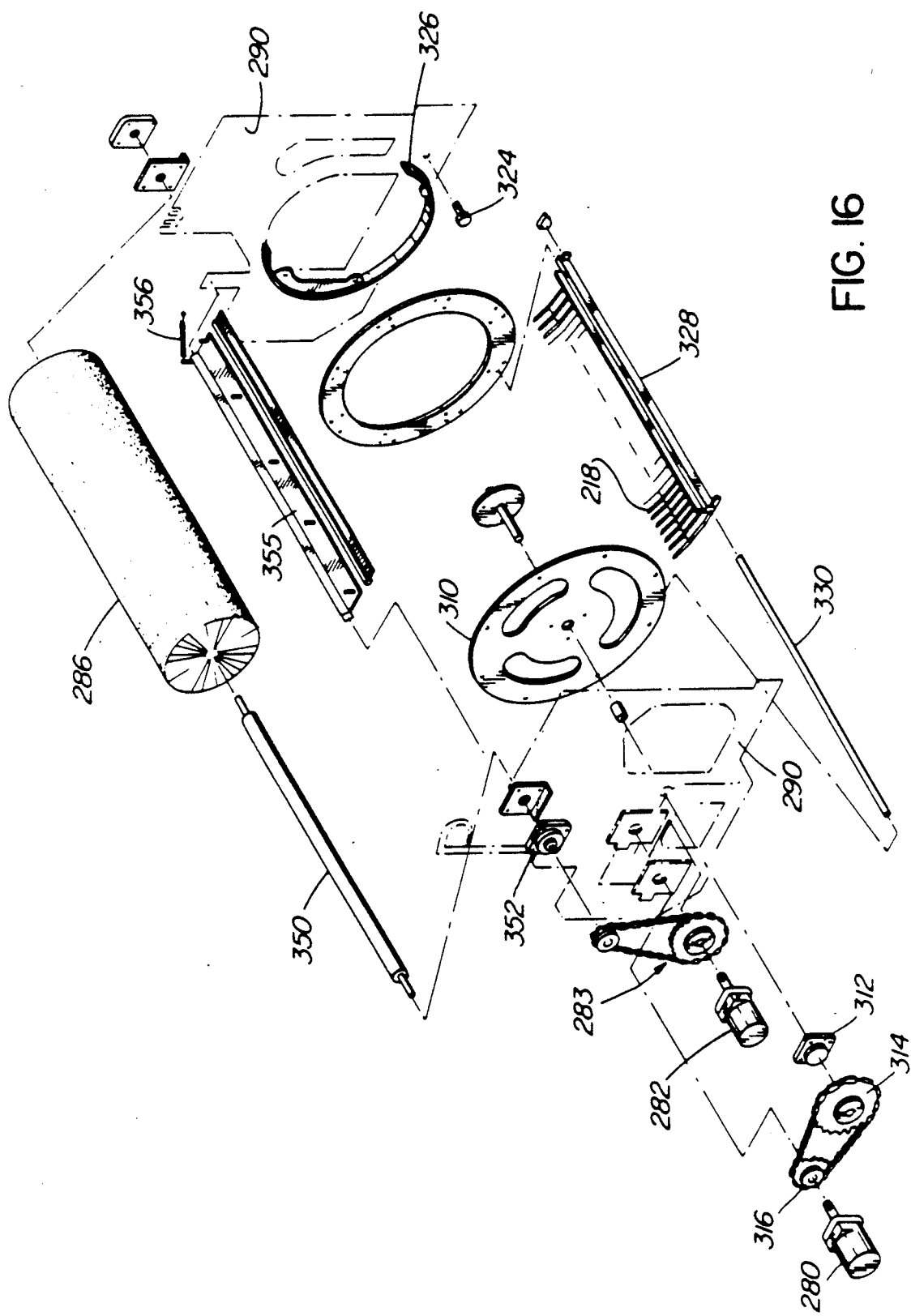
FIG. 16 is an exploded perspective view of the reel, cam and brush assemblies and the drives therefor.

The reel 216 is rotatably mounted within frame 214, the reel including opposed end plates 310 and 312 as best seen in FIG. 16. Both end plates 310 and 312 have a circular outline and end plate 310 is journalled in hub 312 affixed to a frame side plate 290. A short shaft section extending outwardly from the center of reel end plate 310 and through hub 312 has a drive sprocket 314 keyed thereto, such sprocket being driven in rotation by hydraulic motor 280 via sprocket 316 and roller-link drive chain 318. Hydraulic motor 280 is mounted on a suitable bracket secured to frame side plate 290 with the other hydraulic motor 282 also being mounted by a suitable bracket.

A primary conveyor extends axially within the reel 216 and outwardly through one end of same and since its construction corresponds to that of conveyor 20 shown in FIGS. 4, 6 and 7 of the previous embodiment, it is not shown here. In order to accommodate this primary conveyor, the opposite reel end plate 312 must have an open center. Accordingly, in order to rotatably support reel end plate 312, rollers 324, journalled on suitable needle bearings, are mounted adjacent the lower edge of the frame side plate 290 associated with reel end plate 312. These rollers contact peripheral edge portions of the reel end plate thus securely supporting same during rotation of the reel 216. This same frame end plate 290 also has bolted to it a cam 326. This cam 326 serves to provide for opening and closing of the tines in a manner which will now be described more fully.

Figure 17:
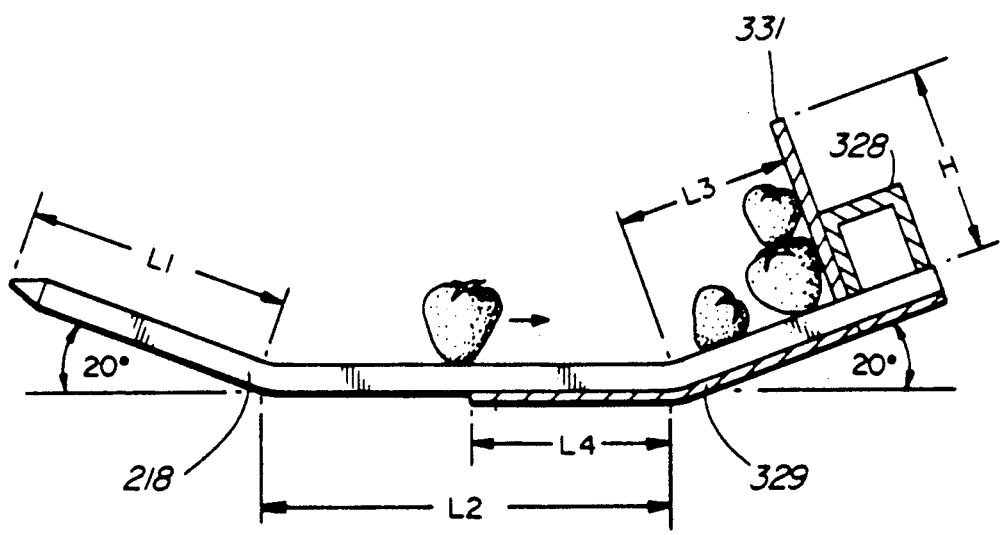
FIG. 17 is an end elevation view of some of the tine bar assemblies.

As with the previous embodiment the individual tines 218 are mounted in spaced parallel relation on elongated tine bars 328 which extend across from one reel end plate 310 to the other reel end plate 312. Each tine bar comprises a tubular member of generally rectangular cross-section as best seen in FIG. 17, each tine bar being drilled at spaced intervals to receive the ends of the tines 218 which are then welded relative to their associated tine bars 328. A plate 329 (FIG. 17) which extends the full length of each tine bar may be provided, such plate having a width such that it extends along about half the length of each tine. Such plates help to stabilize the tines and assist in the entrapment of berries as will be noted hereafter. Retainer plate 331 allows berries to accumulate on the tine bars before they are dumped off. An elongated tine bar support rod 330 extends through the center of each tine bar 328. The opposing ends of each support rod 330 are drilled and tapped to receive threaded studs 332, the latter passing through peripherally spaced apertures provided adjacent the outer peripheries of each of the reel end plates 310 and 312. Accordingly the peripherally spaced support rods 330 serve to rigidly secure the reel end plates 310 and 312 in their parallel spaced apart relationship while at the same time providing support for the tine bars 328 and also allowing the tine bars 328 to rotate thereon thus allowing the tine sets mounted to each tine bar to open and to close during rotation of reel 216 thereby to facilitate the berry stripping action etc. It will be appreciated here that the tines 18 are spaced apart just sufficiently as to allow the berries (strawberries in this case) to be stripped from the plants. Each tine is preferably shaped as in FIG. 17, i.e. in three straight sections, the two end sections being at about a 20 degree angle to the mid-section. The retainer plate 331 extends the full length of each tine bar and helps to prevent the berries from prematurely falling off the tine bar assemblies during operation. In a typical embodiment the tine bars have a ⅜ inch diameter and about a one inch center to center spacing or slightly greater. The other dimensions noted are as follows:

L1—3 ins.
L2—4.5 ins.
L3—2 ins.
L4—2.5 ins.
H—2 ins.

Each tine bar 328 is provided with a cam follower as best shown in FIG. 16 comprising a bracket to which is bolted a smoothly contoured follower body 336 made of a low-friction material such as ultra high molecular weight polypropylene.

Figure 18:
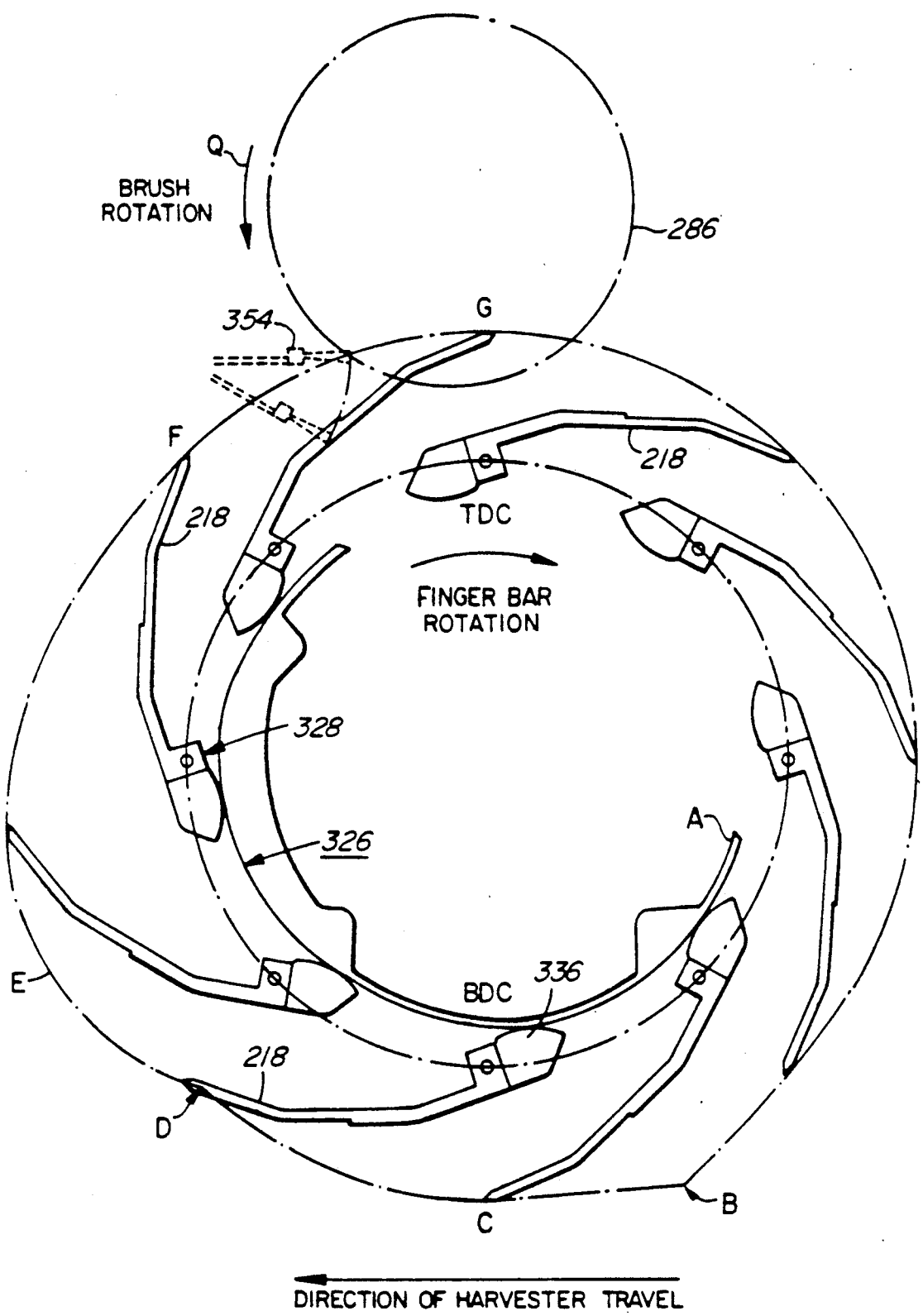
FIG. 18 is an end elevation view showing the cam and tine bar layout, other details of construction being omitted for purposes of simplicity.

Referring now to FIG. 18, the peripherally spaced apart tine bars 328 and their attached sets of tines 218 are shown in outline. As previously noted each tine bar is provided with a cam follower 336 which closely engages the periphery of the previously noted cam 326 which is fixed relative to the frame end plate 290. The force of gravity acting on the tine bar assemblies serves to bias the cam followers 336 into close contacting relationship with the periphery of the arcuate cam 326. Therefore, as the reel 216 rotates in the direction of arrow P as shown in FIG. 18, with the cam followers 336 in contact with the cam 326, the tine bars 328 are made to pivot about their respective support rods 330 in the predetermined cyclical fashion as determined by the shape or contour of cam 326 thereby causing the sets of tines on the respective tine bars 328 to open and close to facilitate the berry stripping action and to ensure that the stripped berries are conveyed upwardly and subsequently directed into the central portion of the reel onto the axially extending primary conveyor 20. The particular movement imparted to the sets of tines 218 is illustrated in FIG. 18 which illustrates the shape of the cam 126 and the shape of the path of motion traced out by the tine tips relative to the reel. The letters TDC and BDC represent the top dead center and bottom dead center positions respectively of the cam followers. In contrast to the blueberry harvester described previously, the reel 216 rotates in opposition to the forward direction of harvester travel as illustrated by the arrows. The effect of this change will become apparent hereinafter.

With continued reference to FIG. 18 the motion of the tine bars 328 relative to the reel as they move past the TDC position will be described. Initially, they are held by gravity in generally closed positions, but as they approach point A on the cam they begin to swing partly "open" under gravity. As soon as the cam follower 336 hits point A, the tine bar is partly closed rapidly so that the tine tips, which by this time have entered the strawberry plants, abruptly change direction at point B and begin to move roughly parallel to the ground surface in fairly close proximity thereto. This requires slight and gradual closure of the tines from point B to point C at the bottom part of the path of tine tip travel. The tine tips then follow a generally circular path from point C to point D, i.e. during the initial part of the upward motion, following which, from point D to point E, the tine tip moves outwardly thereby to enhance the "raking" effect as the tines move through the plants, removing the berries therefrom. Following this, from point E to point F, the tines gradually close to complete the stripping action and between points F and G, the berries collected by the tines are spilled into the primary conveyor which extends within the picking reel and are carried away from it in the same fashion as described previously.

In a typical embodiment of the invention the above-described tine bars 328 are peripherally spaced about a circle having a diameter of, for example, 24 inches. The harvester ground speed is typically in the order of 2 miles per hour. The reel 216 is driven by hydraulic motor 280 at a speed such that each strawberry plant is raked not more than about two times over and preferably only once. This is sufficient to ensure an effective and efficient stripping of the strawberries. If the reel is operated in an overspeed condition, excess leaves will be stripped off and centrifugal forces may interfere with proper disposition of the berries in the primary conveyor; they may be thrown out of the reel instead and lost.

Since the picking reel 216 rotates oppositely to the direction of harvester travel, the harvester travel velocity vector and the tine tip peripheral velocity vector relative to the reel are added together as the tine tips move close to the ground from point B to point C and beyond to provide for movement of each tine tip along a relatively extended path which is close to and almost parallel to the ground. This helps to ensure that the tines get well under the plants at a very low level to ensure effective stripping as the tines rise upwardly along the berry stripping portion of the path of travel. The tine shape described previously also is of benefit in this regard as the straight outer end portion of each tine 218 (which defined length L1) initially travels almost parallel to the ground; then with further rotation of the reel the intermediate tine section moves into general parallelism with the ground and so on. The collected berries move along the tines and move over the plate 329 and lodge against the retainer plate 331. Some leaves are also stripped off and some of the older plants break off at the roots and they also are carried along by the tines and eventually dropped onto the primary conveyor along with the berries.

In order to clear dirt and debris from the tines during operation, the aforementioned cylindrical brush 286 rotates in contact with the tines 218 during the period of time that the closed tines are moving over the TDC position shown in FIG. 18. Thus as brush 286 rotates in the direction of arrow Q, pieces of plant material are effectively removed from the tines and flung away to a point where they will cause no further problems. This brush is rotated by hydraulic motor 282 via chain and sprocket mechanism 283 at a speed of between 500 and 800 RPM. The shaft 350 of brush 286 is journalled adjacent its opposing ends in bearing blocks 352, the latter being mounted adjacent the upper edges of the frame end plates 290 in slotted guideways permitting shaft 350 to be adjusted upwardly or downwardly thereby to provide for the correct amount of brush to tine contact. In a typical embodiment the brush is provided with a 12" outside diameter and a 2" diameter core. The brush may of the spiral wound variety (such as is typically used in street cleaning equipment) and the bristles are typically of medium density polypropylene having a diameter of 0.060 inch.

In addition to the rotary brush 286 there is provided an auxiliary brush 354 (FIGS. 16 and 18) including an elongated brush holder 355 which is pivoted to the frame end plates 290 for motion parallel to the rotation axis of the reel. A spring 356 biases the auxiliary brush 354 into contact with the tines shortly in advance of the point at which the tines pass under the brush 286. The auxiliary brush has stiff bristles 358 which help to brush small berries, which tend to cling to the outside of the tines, down so that they can be caught by the next succeeding tine bar and thence dumped into the center of the picking reel onto the primary conveyor therein.

The construction, mounting, and manner in which the primary and secondary conveyors of the strawberry harvester are driven are the same as described previously in connection with primary and secondary conveyors 20 and 22 of the blueberry harvester and there is no need to repeat such description here except to note that both conveyors of the strawberry harvester are made wider, in many cases twice as wide, as the corresponding conveyors of the blueberry harvester thereby to carry the larger quantities of leaves etc. removed by the picking reel.

Since the berries passing outwardly of the picking head 212 and along the secondary conveyor 222 will be contaminated with leaves, vines and other foreign material, a small blower arrangement 416 is mounted just below the horizontal rear end section of the secondary conveyor as illustrated in FIG. 14. This blower is driven by a small electric motor and is provided with a fan housing enclosing a centrifugal fan, the output of which is directed through an outlet nozzle 422, the slot-like mouth of which is located just below the extreme terminal end of the secondary conveyor 222. Thus, as the strawberries and debris fall downwardly from the outer end of the secondary conveyor 222, the lighter leaves and other debris are carried away from the falling berries by virtue of the stream of air being emitted from the mouth of nozzle 422. The falling berries are deposited in containers of a convenient size (not shown) which are positioned on the subplatform 226 during operation. An operator positioned on main platform 224 positions the containers as desired and, when suitably filled, stacks them in convenient locations on platform 224.

The operation of the strawberry harvester described above will be readily apparent from a review of the foregoing description. When travelling to the picking site the previously described hoisting lever 252 is in the "up" position as also is the picking head 212 thereby allowing for easy transport to the picking area. When the picking area has been reached the picking head 212 is aligned with a row of strawberries and, hoisting lever 252 is lowered downwardly until the picking head is supported on the ground by way of the previously described wheel sets 228. The several hydraulic motors, 280, 282 and 284 are activated so as to drive reel 216, brush 286 and the primary and secondary conveyors in the manner described previously. The tractor is then put in its lowest gear and made to move forwardly at slow speed e.g. about 2 miles per hour, with the result being that the row of berries is picked from the field. In the next picking course the tractor follows along side the picked row and the next adjacent row is picked and so on. Since the rate of speed of the hydraulic motors may be closely controlled, variations can be made in the speed of reel rotation etc. thereby to optimize the picking operation.

It is noted here that the strawberry harvester will most likely find its main usage in the commercial picking of berries to be used for strawberry jam. The picker does cause some scuffing of the berries; this may render these berries unacceptable for sale as fresh berries but it is perfectly acceptable in the case of "jam" or "freezer" berries etc.

It is also noted that extra care should be taken in the planting of the berries; the mounds or rows should be kept fairly low and flattened on the top. Clumps of clay, sods, etc. should be removed so they are not picked up by the harvester. During harvesting it will be noted that some of the plants are removed and taken up by the harvester. However, closer inspection will reveal that many of these are the old "mother" plants which are relatively unproductive anyway so their loss is of no concern and may in fact be beneficial. The stripping of leaves again is of little concern; the plants, in most cases, will be mowed down after harvesting.

Since berries tend to ripen unevenly, the first couple of pickings may be by hand for the "fresh" berry market following which the harvester may be used to remove the remaining berries. Some of these berries will be green; this is of little concern (within reasonable limits, of course), since the green berries supply substantial amounts of the pectin needed for strawberry jam and helps avoid the need for the addition of pectin from other sources.

We claim:

1. Apparatus for harvesting berries on low plants especially strawberries comprising: a picking head including a frame movable along the ground over the crop of berries in a path of travel and a reel mounted on the frame for rotation about an axis transverse to the circumferentially spaced rows of tines thereon adapted to move and to enter into the berry plants and to engage the berries and to strip them from the plants, cam means for moving said tines relative to said reel to facilitate the stripping action and to facilitate deposit of the berries into the reel, conveyor means to carry the berries outwardly of the reel and thence into a container, and wherein said reel is rotated in a direction such that free end portions of those tines closest to the ground point in the forward direction of harvester travel, with the cam means and the tine shapes being selected to that, during use, at least said free end portions of the tines can travel generally parallel to the ground for a relatively extended distance to assist in recovery of berries lying close to the ground and further including a main rotary brush and drive means therefor for engaging said tines and removing debris therefrom adjacent an upper portion of the path of tine travel, and auxiliary brush means located in advance of the main brush means for engaging the successive rows of tines and sweeping away any berries that cling to the outside portions of the tines to sweep them inwardly so that they may be caught by the next following set of tines and then deposited into the conveyor means.

2. Apparatus as in claim 1 wherein said tines include a plurality of straight sections angularly disposed relative to one another to enhance the effect of tine travel generally parallel to the ground.

3. Apparatus as in claim 2 wherein each of said rows of tines includes plate means for assisting in retaining berries on the rows of tines until they are deposited into the reel and onto the conveyor means therein.

4. Apparatus for harvesting berries on low plants especially strawberries comprising: a picking head including a frame movable along the ground over the crop of berries in a path of travel and a reel mounted on the frame for rotation about an axis transverse to the path of travel; said reel having a plurality of circumferentially spaced rows of tines thereon adapted to move and to enter into the berry plants and to engage the berries and to strip them from the plants, cam means for moving said tines relative to said reel to facilitate the stripping action and to facilitate deposit of the berries into the reel, conveyor means to carry the berries outwardly of the reel and thence into a container, and wherein said reel is rotated in a direction such that free end portions of those tines closest to the ground point in the forward direction of harvester travel, with the cam means and the tine shapes being selected so that, during use, at least said free end portions of the tines can travel generally parallel to the ground for a relatively extended distance to assist in recovery of berries lying close to the ground and further including means for towing said picking head, means rollingly supporting the picking head from the ground and means allowing free pitching and rolling motion of the picking head such that the picking head is free to follow the contours of the ground as it is towed along.

5. Apparatus for harvesting berries on low plants especially strawberries comprising: a picking head including a frame movable along the ground over the crop of berries in a path of travel and a reel mounted on the frame for rotation about an axis transverse to the path of travel; said reel having a plurality of circumferentially spaced rows of tines thereon adapted to move and to enter into the berry plants and to engage the berries and to strip them from the plants, cam means for moving said tines relative to said reel to facilitate the stripping action and to facilitate deposit of the berries into the reel, conveyor means to carry the berries outwardly of the reel and thence into a container, and wherein said reel is rotated in a direction such that free end portions of those tines closest to the ground point in the forward direction of harvester travel, with the cam means and the tine shapes being selected so that, during use, at least said free end portions of the tines can travel generally parallel to the ground for a relatively extended distance to assist in recovery of berries lying close to the ground and wherein each of said rows of tines has a respective cam follower, the cam followers being adapted for engagement with the cam means as the reel rotates during use with said cam followers moving around a circular path as the reel rotates during use through top dead center (TDC) and bottom dead center (BDC) positions; said cam means being arranged and shaped such that s the tines move downwardly away from the TDC position they begin to swing open so that the tine tips enter the strawberry plants; with the cam followers then successively meeting a first part of the cam means which is shaped so that the tines move in the closing direction and such that the free ends of the tines tend to move generally parallel to the ground surface, a further portion of the cam means being shaped so that as the cam followers move upwardly and away from the BDC position said tines move outwardly in the opening direction to effect raking of the berries as the tines move through the plants, with a still further portion of the cam means being shaped such that said tines move in the closing direction to complete the raking effect and to deposit the berries onto the conveyor means within the reel as the cam followers move toward the TDC position.

* * * * *